United States Patent [19]
Tanaka

[11] 4,281,906
[45] Aug. 4, 1981

[54] ZOOM LENS

[75] Inventor: Kazuo Tanaka, Tokyo, Japan

[73] Assignee: Canon Kabushiki Kaisha, Tokyo, Japan

[21] Appl. No.: 22,331

[22] Filed: Mar. 20, 1979

[30] Foreign Application Priority Data

Mar. 27, 1978 [JP] Japan .................................. 53-35236

[51] Int. Cl.³ .............................................. G02B 15/18
[52] U.S. Cl. ................................................... 350/427
[58] Field of Search ................................. 350/184, 186

[56] References Cited
U.S. PATENT DOCUMENTS

| | | | |
|---|---|---|---|
| 3,609,005 | 9/1971 | Nakamura | 350/184 |
| 4,015,895 | 4/1977 | Hirose | 350/184 |
| 4,033,674 | 7/1977 | Sekiguchi | 350/184 |
| 4,157,211 | 6/1979 | Tanaka | 350/184 |

*Primary Examiner*—Conrad J. Clark

[57] ABSTRACT

A zoom lens comprising, from front to rear, a first lens group of positive power movable for focusing, second and third lens groups of negative power movable for zooming, and a fourth lens group stationary during focusing and zooming. When zooming is performed from the wide angle to the telephoto setting, the aforesaid second lens group is axially moved in a one-directional manner toward the image plane, while the aforesaid third lens group is axially moved in a reciprocating manner toward the object. With this type zoom lens, a compact structure is realized by positioning the rear principal plane of the aforesaid first lens group as near the image side as possible and the rear principal plane of the aforesaid second lens group as near the object side as possible.

3 Claims, 12 Drawing Figures

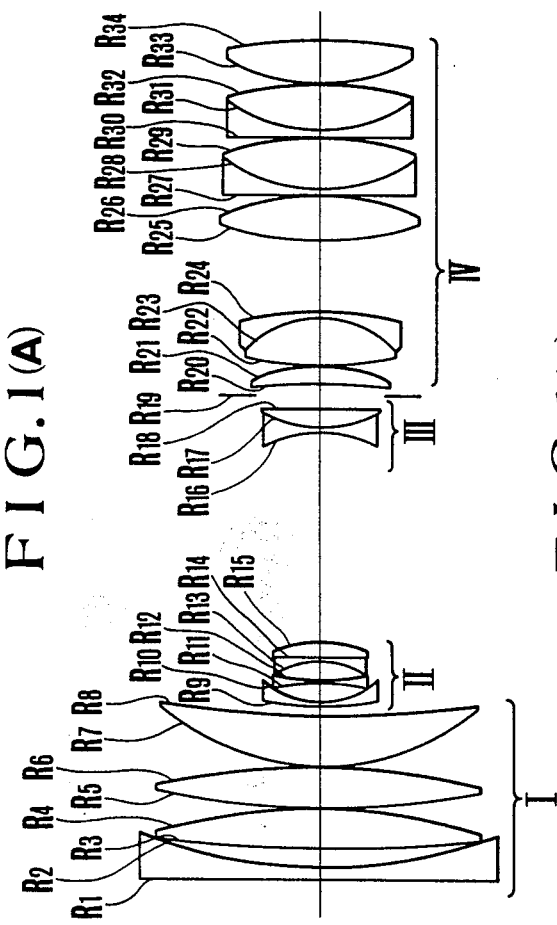
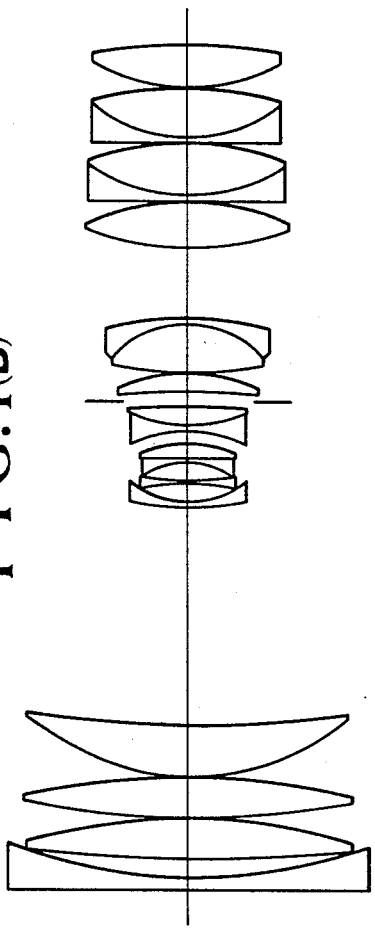

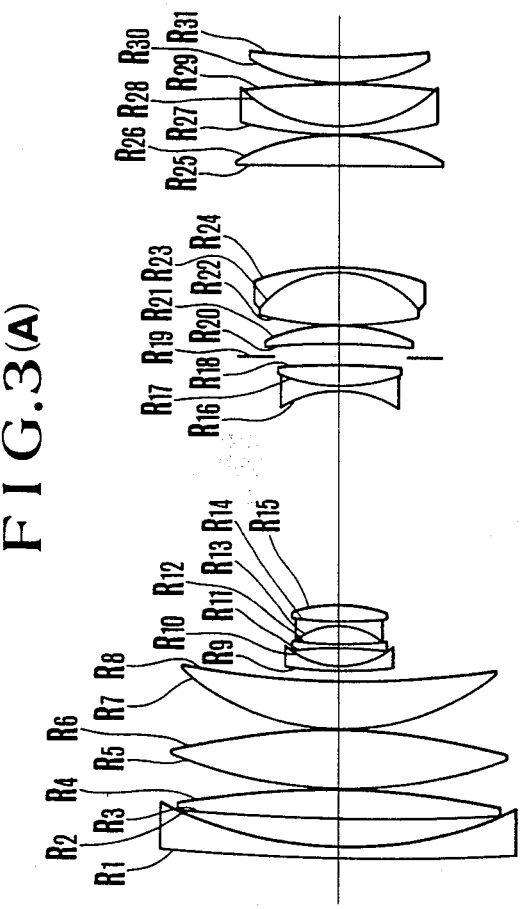
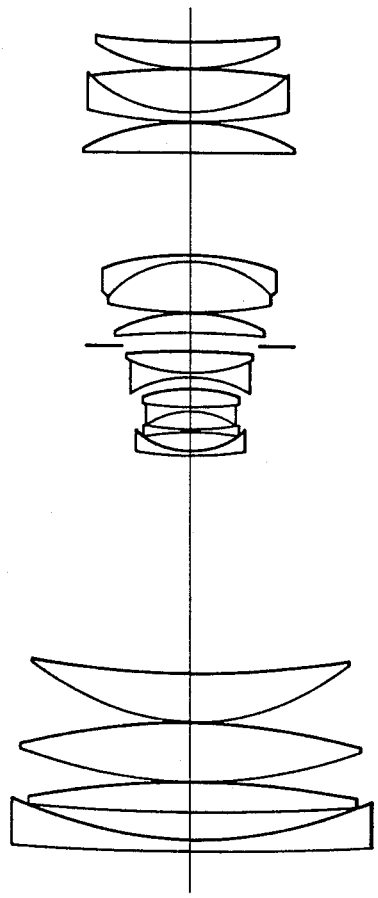
FIG.3(A)
FIG.3(B)

ZOOM LENS

BACKGROUND OF THE INVENTION

This invention relates to compact zoom lenses.

Recently, in the zoom lens art, a small size and compact structure has been looked for and a wide variety of proposals have been made. For example, in U.S. Pat. Application Ser. No. 770,777 (filed on Feb. 22, 1977) the power of the zoom section is distributed over three lens groups so that the amounts of movement of the lenses in the zoom section are decreased to achieve a decrease in the physical length of the entire lens system. Also, in U.S. Pat. No. 4,094,586, the decrease in the amount of movement of the zoom section is combined with a suitable design of the fixed lens group of telephoto type that follows the zoom section to effect a minimization of the size and bulk. Further, in U.S. Pat. No. 3,848,969, the bulk and size of the lens system is minimized by constructing the entire lens system from two movable lens groups.

In general, minimization of the bulk and size of a lens system may be achieved by strengthening the powers of the individual lens groups constituting that lens system. But, this gives rise to aberrational problems and, particularly the Petzval sum will be made difficult to correct. Further, the larger the zoom ratio of the zoom lens, and the smaller the intended F-number of the zoom lens then, the more difficult is the achievement of compactness of the zoom lens.

SUMMARY OF THE INVENTION

The present invention has for its general object the provision of a zoom lens of small bulk and size with a good state of correction of the various abberations and in particular the Petzval sum, while nevertheless providing for a high zoom ratio and a large relative aperture.

According to the present invention, this object is achieved by the choice of a suitable zoom type and by a novel power distribution and lens construction and arrangement.

The zoom lens of the invention comprises, from front to rear, a first lens group of positive power having a focusing function, a second lens group of negative power movable for zooming, a third lens group of negative power movable for zooming, and a fourth lens group of positive power which is always stationary. Further, in the present invention, the rear principal plane of the above-identified first lens group is positioned on the image side thereof, and the front principal plane of the second lens group is positioned on the object side thereof, so that in a state where the first and second lens groups assume closest positions to each other, mechanical interference between the bodies of the first and second lens groups can be avoided. Thus, a compactness of the lens system can be achieved.

To put such lens system into practice, according to one of the features of the present invention, the aforesaid first lens group of positive power is constructed as including a lens part of negative power at the front. In a more specific sense, there is created an air lens of considerably strong negative power by the rear surface of a frontmost lens element and the front surface of a lens element that is positioned just in the rear of said frontmost lens element. The aforesaid second lens group of negative power is, on the other hand, constructed so as to include at least two negative lens elements at a front part thereof.

In a preferred embodiment of a zoom lens according to the present invention which will be described in detail later, the aforesaid first lens group comprises, from front to rear, a negative first lens, a positive second lens, a positive third lens, and a positive fourth lens, the negative first and positive second lenses defining a negative air lens in meniscus form. Further, the axial thickness of this air lens is preferably thicker than that of the negative first lens and thinner than that of the positive second lens. The second lens group comprises, from front to rear, a negative first lens of meniscus form convex toward the front, a second bi-concave lens, and a third cemented lens of a positive lens element and a negative lens element.

Further, in the zoom lens of the present invention to be described later, as zooming is performed from the wide angle settings to the telephoto settings, the aforesaid second lens group and third lens group are axially moved in such relation to each other that the second lens group travels straightly from the object side to the image surface side, and the third lens group concurrently reciprocates first in a direction toward the object side. The above-mentioned fourth lens group remains stationary during focusing and during zooming. The above-defined zoom lens satisfies the following relationships:

$$(F_1 \cdot F_T)/f_T < 1.1 \quad |f_1/f_3| < 1.9 \quad |f_3/f_2| > 2.5$$

wherein $f_i$ is the focal length of the i-th lens group; $f_T$ is the focal length of the entire lens system in the telephoto setting; and $F_T$ is the maximum relative aperture in the telephoto setting. By employing such type of zoom lens and power arrangement, it is made possible to obtain a zoom lens of minimized bulk and size without causing the flatness of image plane (Petzval sum) to be deteriorated by the minimization of the bulk and size, despite the fact that the zoom ratio reaches about 13, and the maximum relative aperture reaches 1.6.

BRIEF DESCRIPTION OF THE DRAWINGS

FIGS. 1(A) and 1(B) are block diagrams of one embodiment of a zoom lens according to the present invention in the wide angle and telephoto settings respectively.

FIGS. 3(A) and 3(B) are block diagrams of another embodiment of a zoom lens according to the present invention.

DESCRIPTION OF THE PREFERRED EMBODIMENTS

Figure 2A:
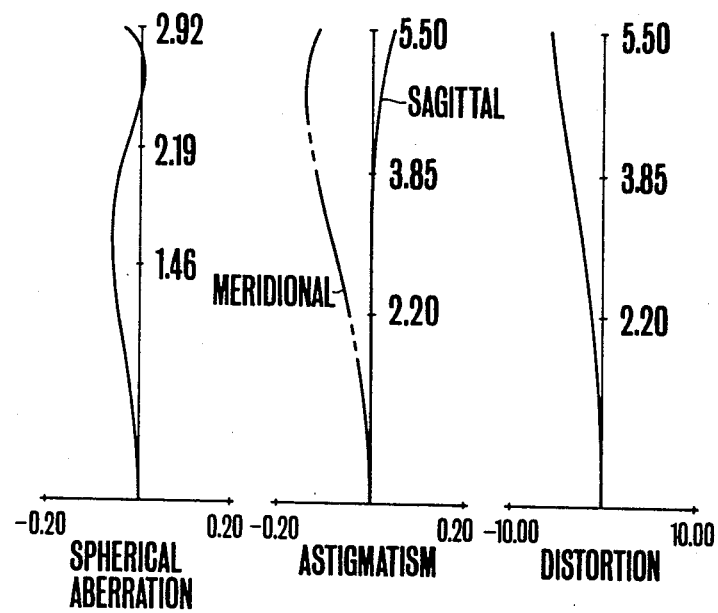
FIGS. 2(A) and 2(B) are graphs showing the aberrations of the zoom lens of FIG. 1.

In the case of a four-component zoom lens with a focusing first lens group, negative second and third lens groups for zooming and a fourth lens group stationary during focusing and during zooming arranged successively in this order from the front, the present inventor has now found that the length of the zoom section, that is, the length of the entire lens system can be effectively shortened when the second and third lens groups are moved in a relationship as defined by:

$$|\beta_2W| < 1, |\beta_3W| < 1$$
$$|\beta_2T| > 1, |\beta_3T| < 1 \quad (1)$$

where $\beta_2W$ is the lateral magnification of the second lens group in the wide angle setting; $\beta_3W$ is the lateral magnification of the third lens group in the wide angle setting; $\beta_2T$ is the lateral magnification of the second lens group in the telephoto setting; and $\beta_3T$ is the lateral magnification of the third lens group in the telephoto setting. The inequalities (1) mean in a physical sense that as zooming is performed from the wide angle to the telephoto settings, the second lens group is moved from the front to the rear in a monotonic manner, while the third lens group is first moved to the front and then to the rear in a reciprocating manner.

The stronger the power arrangement of the focusing positive first lens groups for focusing and the negative second and third lens groups for zooming are made, the smaller the size of the zoom lens system can be made. When the powers of the individual lens groups deviate from proper values, however, the negative Petzval sum representing the flatness of the image plane ascribable to the zoom lens groups becomes too large to be compensated for by the lens group that follows the zoom lens groups. This limit is determined to be:

$$|f_1/f_3| < 1.9 \quad (2)$$

$$|f_3/f_2| > 2.5 \quad (3)$$

where $f_1$ is the focal length of the first lens group; and $f_2$ and $f_3$ are the focal lengths of the second and third lens groups respectively. When the inequality (3) is not fulfilled, the power of the third lens group is strengthened, and, therefore, the radii of curvature of the individual surfaces and particularly the frontmost surface in the third lens group are increased to such extent that not only the Petzval sum but also the variation of spherical aberration with zooming is unallowable.

For minimization of the bulk and size of the first lens group, the following inequality must be satisfied:

$$(f_1 \cdot F_T)/f_T < 1.1 \quad (4)$$

where $f_T$ is the focal length of the entire zoom lens system at the telephoto setting and $F_T$ is the maximum relative aperture at the telephoto setting. When the inequality (4) is violated, correction of spherical aberration in the telephoto settings and in the neighbourhood thereof becomes impossible. The simultaneous satisfaction of the above-described conditions (2), (3) and (4) will lead to the achievement of good correction for the aberrations and particularly the Petzval sum which would otherwise result from the minimization of the bulk and size.

The foregoing discussion is directed to the thin lens design. Therefore, in putting the principles into practice for the thick lens system, it is not always possible to avoid mechanical interference between the first lens group and the second lens group or the variator and between the variator and the thid or compensator lens group. On this account, the present invention sets forth the following features for the construction and arrangement of constituent lenses in the first and second lens groups.

Consideration will first be given to the insurance of a sufficient air separation between the first and second lens groups. For this purpose, the first lens group is constructed from four members with four elements, and their arrangement comprises, from front to rear, a negative 11th lens, a positive 12th lens, a positive 13th lens and a positive 14th lens with the resultant air lens between the 11th and 12th lenses being configured to a negative air lens having a sufficient power. To facilitate this, it is preferred to make the axial thickness of the air lens thicker than that of the 11th lens and thinner than that of the positive 12th lens. When the thickness of the air lens is thinner than that of the negative 11th lens, it becomes impossible to expect the provision of the position of the rear principal point of the first lens group on the image side thereof, while when thicker than that of the positive 12th lens, it becomes impossible to prevent production of flare aberration from occurring near and at the telephoto settings, though the tendency of shifting the rear principal point toward the rear becomes large.

This air lens is further characterized by fulfilling the following condition:

$$0.43 < |P \cdot f_1| < 0.46 \quad (5)$$

where P is the sum of the powers of the both surfaces of aforesaid 11th lens and the front surface of the aforesaid 12th lens. Since the inequality (5) is expressed in terms of some of the parameters of the first lens group, the meaning of this condition should be explained below. In order that the first and second lens groups do not contact with each other as the power arrangement of the individual lens groups is strengthened, it is required to position the rear principal point of the first lens group as near the image side as possible. Since the power of the first lens group is positive, this requirement is fulfilled by locating the negative elements of the first lens group as far ahead as possible. To realize this, according to the present invention, the power of the negative air lens formed between the negative 11th and positive 12th lenses is increased, and/or a negative power is imparted into the front surface of the negative 11th lens. When the lower limit of the inequality (5) is exceeded, the negative power of the front surface of the negative 11th lens becomes too large to enable the distortion to be corrected in the wide angle settings. When the upper limit of the inequality (5) is exceeded, the air lens becomes too large to effect over-correction of astigmatism in the intermediate zooming positions.

In order that the power arrangement of the individual lens groups can be made severe within the framework of the inequalities (2) and (3) while still preserving a sufficient axial separation between the second and third lens groups, according to the present invention, the second lens group is constructed from three members with four elements, and their arrangement comprises, from front to rear, a negative meniscus lens convex toward the front, a bi-concave lens, and a doublet lens of a bi-concave lens element and a bi-convex lens element cemented together at their adjoining surfaces. An important point is that, by dividing the power of the second lens group on the meniscus lens and bi-concave lens, the overall thickness of the second lens group is reduced, and further the position of the front principal point of the second lens group is made as far ahead as possible. Such distribution of the power of the second lens group on the two members gives rise to an advantage that the distortion introduced by the first lens group in the wide angle settings can be corrected with ease. Another advantage is that the radius of curvature of the rearmost surface in the second lens group can be made equal to that of the frontmost surface in the third lens group, thereby a further minimization of the length of the entire lens system can be facilitated.

Figure 2B:
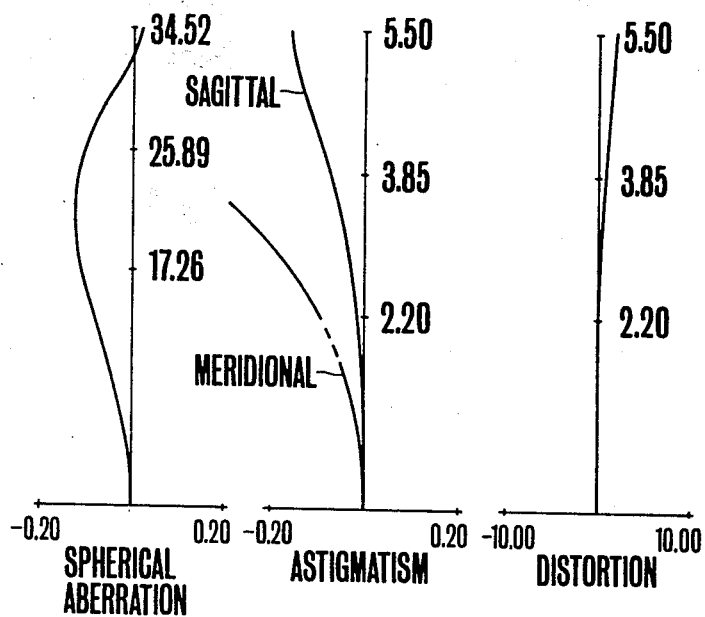
Figure 5:
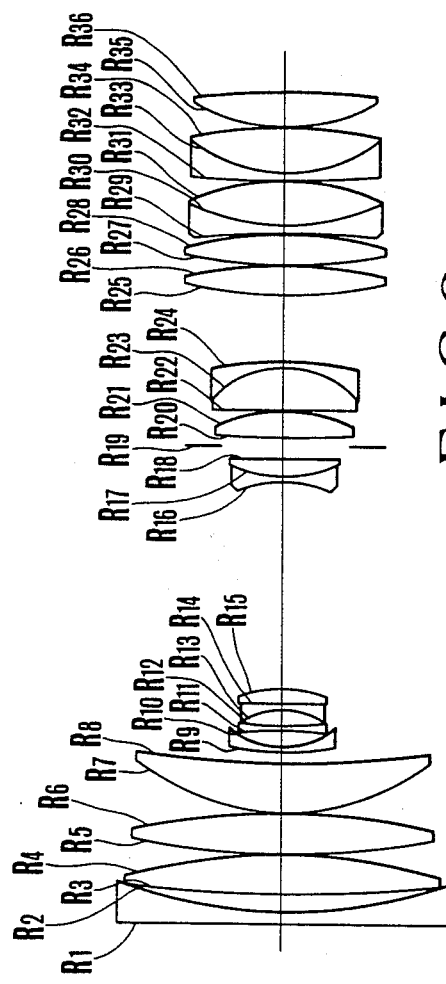
FIG. 5 is a block diagram of still another embodiment of a zoom lens according to the present invention.

Three preferred embodiments of the present invention are represented in FIGS. 1, 3 and 5. In FIG. 1, the zoom lens comprises a positive first lens group I of surfaces $R_1$ and $R_8$, a negative second lens group II of surfaces $R_9$ to $R_{15}$, a negative third lens group III of surfaces $R_{16}$ to $R_{18}$, a diaphragm $R_{19}$, and a positive fourth lens group IV of surfaces $R_{20}$ to $R_{34}$ arranged in this order from the front, with FIG. 1(A) showing the wide angle position of the zoom lens, and FIG. 1(B) showing the telephoto position of the zoom lens. The various aberrations of the lens system of FIG. 1 in the wide angle and telephoto settings are shown in FIGS. 2(A) and 2(B) respectively. This zoom lens can be constructed in accordance with the numerical data given below for the radii of curvature, r, the axial separations, di, between the i-th and (i+1)th surfaces along with the dispersive indices, V, for the various lens elements and the corresponding indices of refraction, N, for the spectral D line of sodium.

| f = 9.345 − 118.123 Zoom Ratio = 12.64 Back Focal Length = 79.078 | | | | |
|---|---|---|---|---|
| Surface No. | r | d | V | N |
| R 1 | −2337.70 | 2.50 | 25.40 | 1.80518 |
| R 2 | 107.51 | 3.84 | | 1. |
| R 3 | 330.35 | 8.40 | 95.10 | 1.43387 |
| R 4 | −123.70 | 0.15 | | 1. |
| R 5 | 181.98 | 8.36 | 81.60 | 1.49700 |
| R 6 | −158.76 | 0.15 | | 1. |
| R 7 | 52.34 | 10.76 | 55.50 | 1.69680 |
| R 8 | 237.88 | $D_1^*$ | | 1. |
| R 9 | 61.10 | 1.00 | 40.80 | 1.88300 |
| R 10 | 18.77 | 3.80 | | 1. |
| R 11 | −63.98 | 0.80 | 46.60 | 1.80400 |
| R 12 | 82.33 | 3.76 | | 1. |
| R 13 | −16.14 | 0.80 | 49.60 | 1.77250 |
| R 14 | 307.48 | 3.20 | 21.30 | 1.92286 |
| R 15 | −28.88 | $D_2^*$ | | 1. |
| R 16 | −26.20 | 0.90 | 49.60 | 1.77250 |
| R 17 | 29.28 | 3.70 | 25.40 | 1.80518 |
| R 18 | −786.13 | $D_3^*$ | | 1. |
| R 19 | Diaphragm | 2.24 | | 1. |
| R 20 | −160.22 | 3.88 | 40.70 | 1.58144 |
| R 21 | −35.70 | 0.15 | | 1. |
| R 22 | 82.00 | 10.11 | 42.80 | 1.56732 |
| R 23 | −21.90 | 1.20 | 40.80 | 1.88300 |
| R 24 | −73.59 | 14.87 | | 1. |
| R 25 | 65.40 | 9.55 | 60.50 | 1.51112 |
| R 26 | −57.48 | 0.15 | | 1. |
| R 27 | −1739.44 | 1.20 | 40.80 | 1.88300 |
| R 28 | 37.25 | 10.97 | 65.90 | 1.50048 |
| R 29 | −64.96 | 0.15 | | 1. |
| R 30 | 10851.00 | 1.20 | 37.20 | 1.83400 |
| R 31 | 32.11 | 9.89 | 70.10 | 1.48749 |
| R 32 | −87.01 | 0.15 | | 1. |
| R 33 | 38.76 | 9.25 | 70.10 | 1.48749 |
| R 34 | −121.00 | | | |

| Thick Lens Separations during Zooming with Object at Infinity | | | |
|---|---|---|---|
| | $D_1^*$ | $D_2^*$ | $D_3^*$ |
| Wide Angle Setting | 0.60003 | 44.39432 | 3.0031 |
| Telephoto Setting | 44.1407 | 2.7126 | 1.1441 |

Figure 4A:
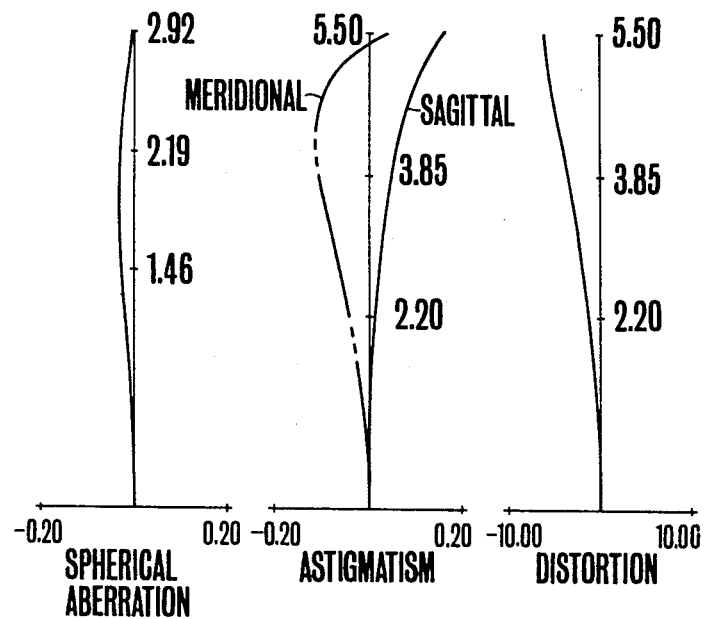
FIGS. 4(A) and 4(B) are graphs showing the aberrations of the zoom lens of FIG. 3.
Figure 4B:
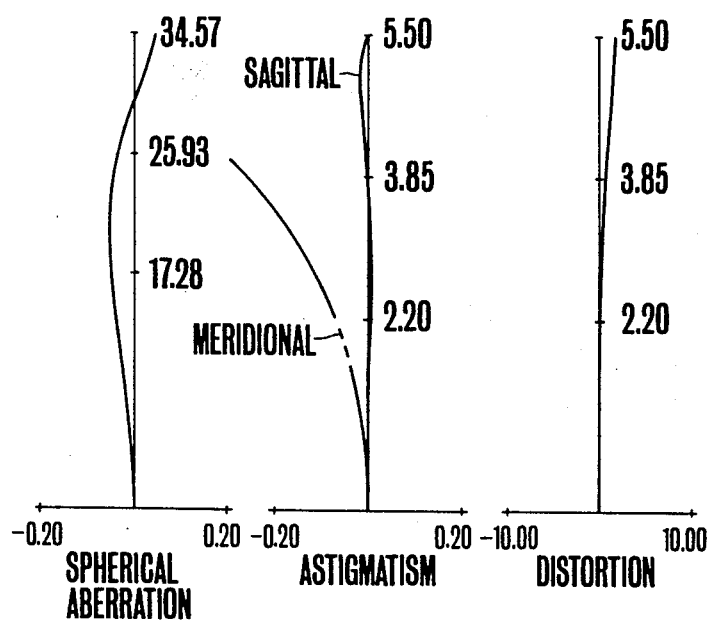

FIG. 3 shows the second embodiment of the zoom lens according to the present invention comprising a first lens group I of surfaces $R_1$ to $R_8$, a second lens group II of surfaces $R_9$ to $R_{15}$, a third lens group III of surfaces $R_{16}$ to $R_{18}$, a diaphragm $R_{19}$, and a fourth lens group IV of surfaces $R_{20}$ to $R_{31}$, with FIG. 3(A) showing the wide angle position and FIG. 3(B) showing the telephoto position of the zoom lens. The various aberrations of the lens system of FIG. 3 in the wide angle and telephoto settings are shown in FIGS. 4(A) and 4(B) respectively. The zoom lens can be constructed in accordance with the numerical data given below.

| f = 9.347 − 118.182 Zoom Ratio = 12.644 | | | | |
|---|---|---|---|---|
| Surface No. | r | d | V | N |
| R 1 | 705.47 | 2.50 | 25.40 | 1.80518 |
| R 2 | 90.71 | 5.80 | | 1. |
| R 3 | 528.96 | 6.20 | 81.60 | 1.49700 |
| R 4 | −189.48 | 0.17 | | 1. |
| R 5 | 103.40 | 12.24 | 95.10 | 1.43387 |
| R 6 | −136.99 | 0.17 | | 1. |
| R 7 | 52.57 | 10.34 | 55.50 | 1.69680 |
| R 8 | 219.36 | $D_1^*$ | | 1. |
| R 9 | 71.98 | 1.00 | 40.80 | 1.88300 |
| R 10 | 17.87 | 3.75 | | 1. |
| R 11 | −110.47 | 0.80 | 46.60 | 1.80400 |
| R 12 | 78.62 | 3.80 | | 1. |
| R 13 | −15.56 | 1.00 | 49.60 | 1.77250 |
| R 14 | 121.38 | 3.52 | 21.30 | 1.92286 |
| R 15 | −31.11 | $D_2^*$ | | 1. |
| R 16 | −24.59 | 0.90 | 49.60 | 1.77250 |
| R 17 | 36.26 | 4.30 | 25.40 | 1.80518 |
| R 18 | −269.50 | $D_3^*$ | | 1. |
| R 19 | Diaphragm | 2.84 | | 1. |
| R 20 | −176.46 | 3.96 | 27.50 | 1.75520 |
| R 21 | −40.58 | 0.17 | | 1. |
| R 22 | 90.99 | 10.86 | 70.10 | 1.48749 |
| R 23 | −23.60 | 1.30 | 37.20 | 1.83400 |
| R 24 | −54.30 | 21.69 | | 1. |
| R 25 | −1049.55 | 6.25 | 60.70 | 1.60311 |
| R 26 | −47.85 | 0.17 | | 1. |
| R 27 | 95.90 | 1.65 | 25.40 | 1.80518 |
| R 28 | 31.11 | 9.07 | 70.10 | 1.48749 |
| R 29 | −220.14 | 0.17 | | 1. |
| R 30 | 41.33 | 5.74 | 70.10 | 1.48749 |
| R 31 | 208.11 | | | |

| Thick Lens Separations during Zooming with Object at Infinity | | | |
|---|---|---|---|
| | $D_1^*$ | $D_2^*$ | $D_3^*$ |
| Wide Angle Setting | 0.75 | 45.3729 | 1.7472 |
| Telephoto Setting | 38.6023 | 2.5235 | 1.1625 |

Figure 6:
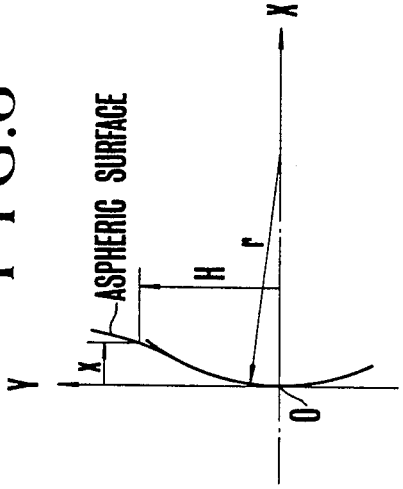
FIG. 6 is a graph considered to define an aspherical surface.

FIG. 5 shows the third embodiment of the zoom lens according to the present invention comprising a first lens group I of surfaces $R_1$ to $R_8$, a second lens group II of surfaces $R_9$ to $R_{15}$, a third lens group III of surfaces $R_{16}$ to $R_{18}$, a diaphragm $R_{19}$, and a fourth lens group IV of surfaces $R_{20}$ to $R_{36}$, in the wide angle position. Two aspherical surfaces are provided at the surfaces $R_{24}$ and $R_{29}$. An equation for these aspheric surfaces $R_{24}$ and $R_{29}$ in terms of the radius of curvature, r, in the paraxial region at the vertex of the aspheric surface defined as shown in FIG. 6 may be expressed as:

$$x = \frac{(\frac{1}{r}) \times H^2}{1 + \sqrt{1 - (\frac{H}{r})^2}} + AH^2 + BH^4 \tag{6}$$

where

| | A | B |
|---|---|---|
| $R_{24}$ | $9.715045 \times 10^{-8}$ | $-2.194778 \times 10^{-10}$ |

-continued

| | A | B |
|---|---|---|
| $R_{29}$ | $-3.025447 \times 10^{-8}$ | $1.899578 \times 10^{-10}$ |

Figure 7A:
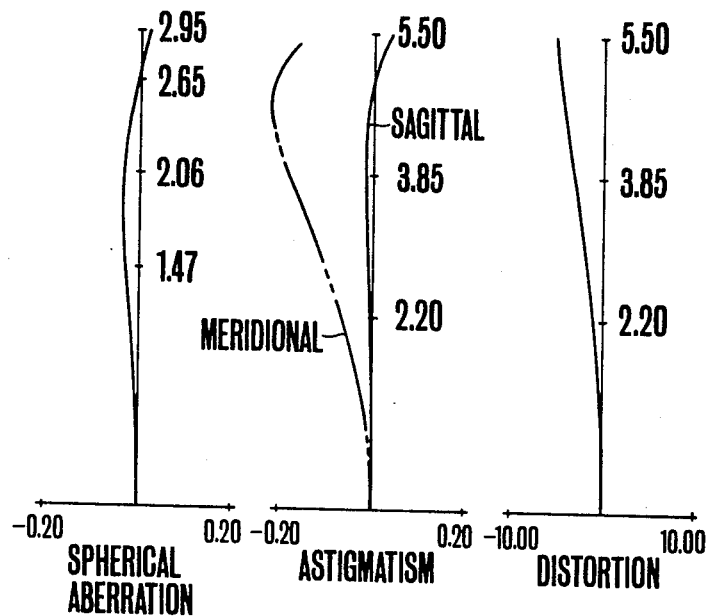
FIGS. 7(A) and 7(B) are graphs showing the aberrations of the zoom lens of FIG. 5.
Figure 7B:
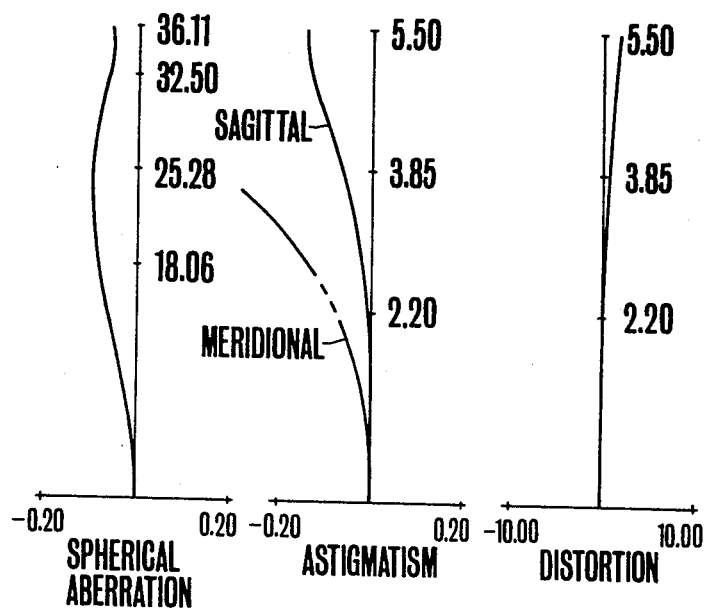

The various aberrations of the lens system of FIG. 5 in the wide angle and telephoto settings are shown in FIGS. 7(A) and 7(B) respectively. This zoom lens can be constructed in accordance with the numerical data given below.

| | f = 9.340 – 118.151 Zoom Ratio = 12.65 | | | |
|---|---|---|---|---|
| Surface No. | r | d | V | N |
| R 1 | −2337.70 | 2.50 | 25.40 | 1.80518 |
| R 2 | 107.51 | 3.84 | | 1. |
| R 3 | 330.35 | 8.40 | 95.10 | 1.43387 |
| R 4 | −123.70 | 0.15 | | 1. |
| R 5 | 181.98 | 8.36 | 81.60 | 1.49700 |
| R 6 | −158.76 | 0.15 | | 1. |
| R 7 | 52.34 | 10.76 | 55.50 | 1.69680 |
| R 8 | 237.88 | $D_1^*$ | | 1. |
| R 9 | 61.10 | 1.00 | 40.80 | 1.88300 |
| R 10 | 18.77 | 3.80 | | 1. |
| R 11 | −63.98 | 0.80 | 46.60 | 1.80400 |
| R 12 | 82.33 | 3.76 | | 1. |
| R 13 | −16.14 | 0.80 | 49.60 | 1.77250 |
| R 14 | 307.48 | 3.20 | 21.30 | 1.92286 |
| R 15 | −28.88 | $D_2^*$ | | 1. |
| R 16 | −26.20 | 0.90 | 49.60 | 1.77250 |
| R 17 | 29.28 | 3.70 | 25.40 | 1.80518 |
| R 18 | −786.13 | $D_3^*$ | | 1. |
| R 19 | Diaphragm | 1.44 | | 1. |
| R 20 | 184.65 | 5.80 | 35.30 | 1.59270 |
| R 21 | −34.15 | 0.15 | | 1. |
| R 22 | 795.29 | 8.90 | 60.50 | 1.51112 |
| R 23 | −21.19 | 1.30 | 40.80 | 1.88300 |
| R 24 | −77.44 | 14.00 | | 1. |
| R 25 | 107.76 | 6.00 | 56.40 | 1.50137 |
| R 26 | −111.53 | 0.15 | | 1. |
| R 27 | 117.66 | 6.40 | 56.40 | 1.50137 |
| R 28 | −91.15 | 0.15 | | 1. |
| R 29 | −248.16 | 1.70 | 40.80 | 1.88300 |
| R 30 | 47.81 | 9.50 | 65.90 | 1.50048 |
| R 31 | −55.27 | 0.15 | | 1. |
| R 32 | 295.02 | 1.60 | 37.20 | 1.83400 |
| R 33 | 33.97 | 9.50 | 70.10 | 1.48749 |
| R 34 | −115.62 | 0.15 | | 1. |
| R 35 | 41.25 | 7.20 | 70.10 | 1.48749 |
| R 36 | −216.98 | | | |

Thick Lens Separations during Zooming with Object at Infinity

| | $D_1^*$ | $D_2^*$ | $D_3^*$ |
|---|---|---|---|
| Wide Angle Setting | 0.57343 | 44.42402 | 3.00000 |
| Telephoto Setting | 41.1407 | 2.7126 | 1.1441 |

What is claimed is:

1. A zoom lens comprising:
a positive first lens group having a focusing function;
a negative second lens group having a zooming function;
a negative third lens group actuated in synchronism with said second lens group to be moved for zooming purposes;
an always-fixed positive fourth lens group for focusing the light flux from said negative third lens group on a predetermined plane;
said first lens group including, from front to rear, a negative 1-1th lens, a positive 1-2th lens, a positive 1-3th lens and a positive 1-4th lens, and an air lens defined by said negative 1-1th lens and said positive 1-2th lens having a negative power, wherein the axial thickness of said negative air lens is thicker than that of said negative 1-1th lens and thinner than that of said positive 1-2th lens; and
said second lens group having at least two negative lenses on the object side and a cemented lens of a positive lens element and a negative lens element at the rearmost position.

2. A zoom lens as described in claim 1, wherein, letting $f_1$ denote the focal length of said first lens group, and P the sum of the powers of the both surfaces of said 11th lens and the front surface of said 12th lens, $$0.43 < |Pf_1| < 0.46$$

is satisfied.

3. A zoom lens as described in claim 2, wherein, letting $f_2$ denote the focal length of said lens group, $f_3$ the focal length of said third lens group, fT the focal length of the entire system in the telephoto end, and $F_T$ the maximum relative aperture in the telephoto end, the following relationships are satisfied:

$$(f_1 F_T)/f_T < 1.1$$

$$|f_1/f_3| < 1.9$$

$$|f_3/f_2| > 2.5.$$

* * * * *